May 31, 1966  I. M. MILLER  3,253,465
WET BULB TEMPERATURE PROBE
Filed Dec. 23, 1963  2 Sheets-Sheet 1
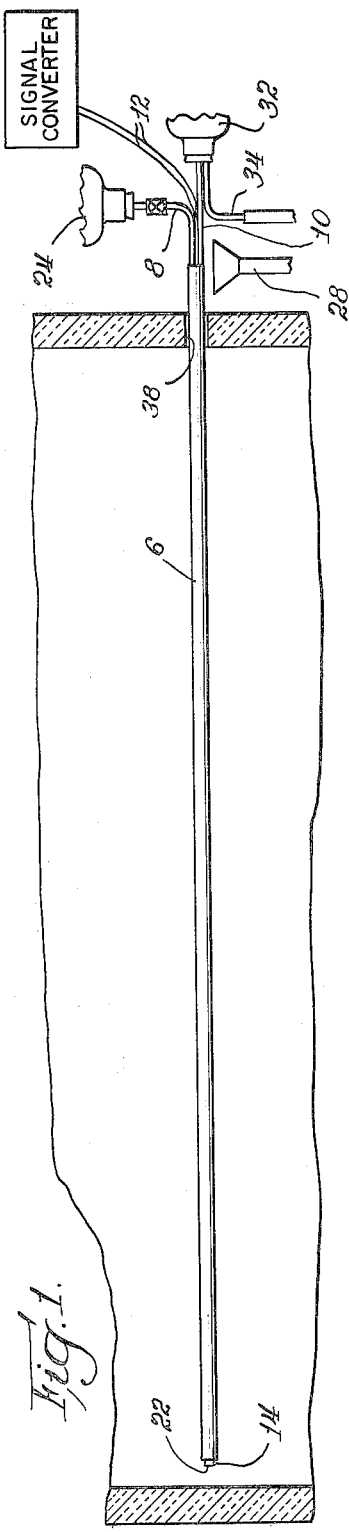
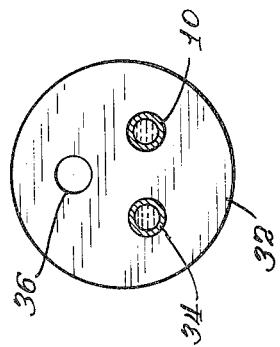
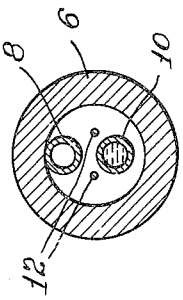
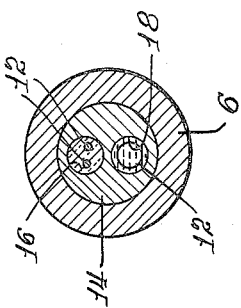
INVENTOR.
Irvin M. Miller
BY
Dominik, Rudy & Stein
Attys.

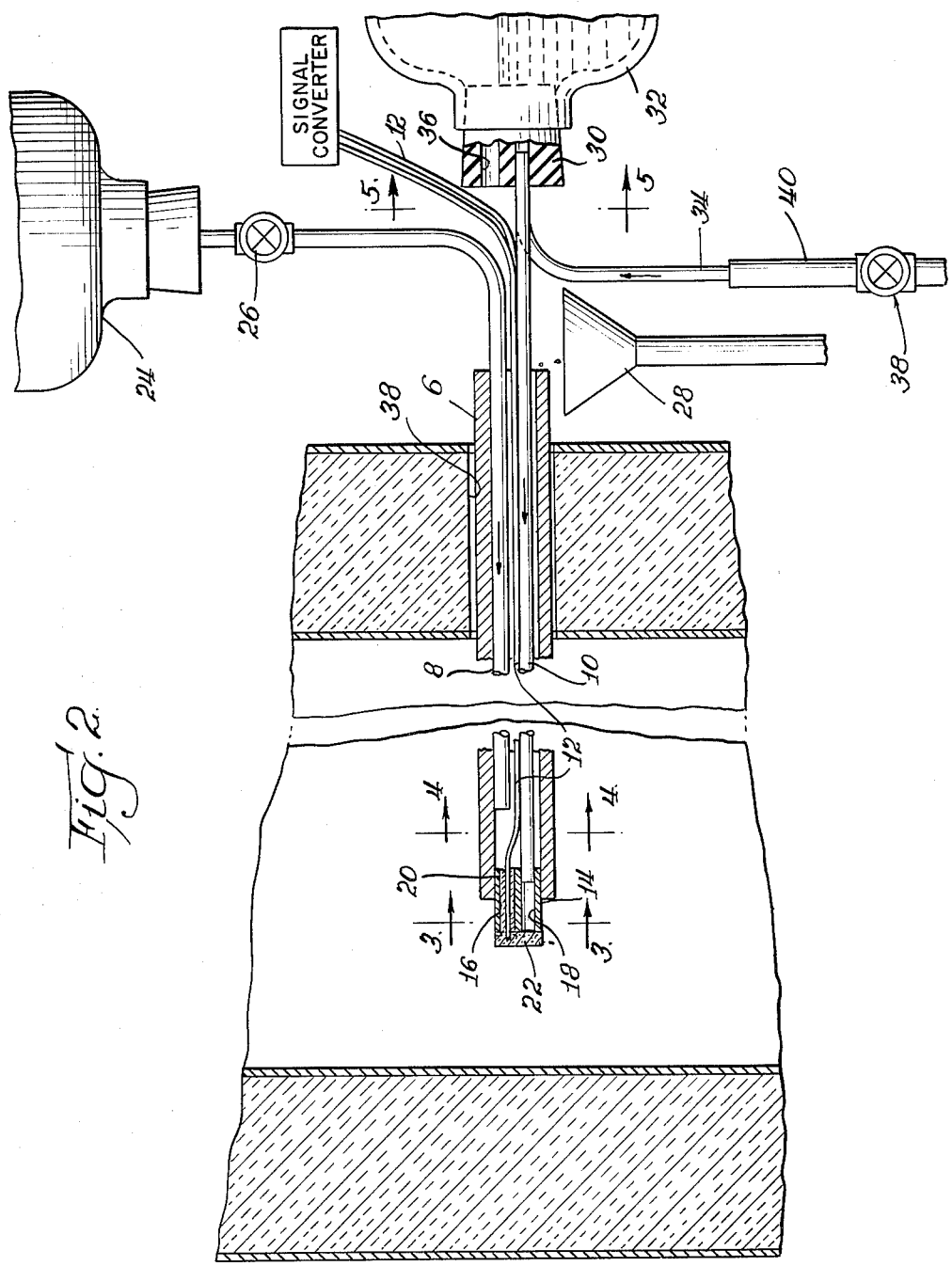

з,253,465
WET BULB TEMPERATURE PROBE
Irvin M. Miller, Newport News, Va., assignor to The Dow Chemical Company, Midland, Mich., a corporation of Delaware
Filed Dec. 23, 1963, Ser. No. 332,491
5 Claims. (Cl. 73—335)

This invention relates to a probe for measurement of wet bulb temperature of a heated fluid medium, such as, air under forced convection in a drying oven.

In the operation of a drying oven using forced air convection at up to 140° C. and possibly higher, it is often necessary, or desirable to obtain a wet bulb temperature reading. Certain physical conditions are generally present in such ovens which make wet bulb temperature measurements extremely difficult. For example, unless specially designed, holes in the walls of the usual drying oven are of small diameter, which necessitates a probe of small diameter. Furthermore, the oven interior dimensions may be such as to require a probe of great length so that it will reach any location in the oven, if necessary. In addition, the probe should provide accurate readings, be simple in structure and operation, and readily portable so that it can be easily inserted in any one of a plurality of holes in the oven wall.

The probe of the present invention satisfies all the desirable criteria for wet bulb temperature measurements in a drying oven. It can be inserted in oven wall holes of small diameter, and is long enough for reaching any location in the oven. It will provide accurate readings, is simple in structure and operation, and is readily portable.

The main object of this invention is to provide a probe for measurement of wet bulb temperature of a heated fluid medium.

A more specific object is to provide a probe for measurement of air under forced convection in a drying oven.

A further object is to provide a wet bulb temperature measurement probe which may be used in small diameter openings, and which will reach any location within a drying oven at which a wet bulb temperature measurement is desired.

Still another object is to provide a wet bulb temperature measurement probe which will provide accurate readings, is simple in structure and operation, and is readily portable.

These and further objects and features of this invention will become more apparent from the following description and accompanying drawings wherein:

FIG. 1 is a view showing apparatus of the invention as being used in a wet bulb measurement test;

FIG. 2 is an enlarged sectional view of the same;

FIG. 3 is an enlarged section view as seen from line 3—3 in FIG. 2;

FIG. 4 is an enlarged section view as seen from line 2—2 in FIG. 2; and

FIG. 5 is an enlarged section view as seen from line 5—5 in FIG. 2.

Referring now to the drawings, numeral 6 identifies a probe including a tubular member in the form of a pipe which is of a length required for reaching an oven temperature zone which measurement of wet bulb temperature is to be made. The inside diameter of the pipe 6 is sufficient to accommodate two smaller diameter tubes 8 and 10, as well as two thermo-couple wires 12. A plug 14 is fixedly positioned in the temperature measuring end of the pipe 6, which plug has two passageways 16 and 18. The forward end of the wires 12 are positioned in the passageway 16 so that the thermo-couple ends thereof project a short distance beyond the end of the plug 14.

A suitable heat resistant flexible sealant 20, such as an epoxy resin, or a silicone rubber, is used to fix the wires in the plug 14. A liquid absorbent fibrous disc, or wad 22, which is made of a heat resistant material such as asbestos, is secured to the end of the plug 14, by a heat-resistant sealant. The tip of the thermo-couple wire 12 i.e. is embedded in the wad 22, as best seen in FIG. 2.

Tube 8 is positioned so that the end within the pipe 6, is positioned a short distance from the plug 14, while the other end projects from the pipe and is arranged for connection with a source of cooling medium under pressure, such as water, in a container 24. A valve 26 is arranged in the tube 8 near the liquid source for regulation of liquid flow in the tube 8. It will be seen that liquid flowing out of the forward end of the tube 8, will flow through the pipe 6 and out of the end into a liquid collector, such as funnel 28 which directs the liquid to a disposal means (not shown). In such manner, the pipe 6 and pipe enclosures may be protected against temperature damage. Also, such an arrangement serves the important function of keeping the probe tip wet, as will later be explained, from flashing into steam when the ambient temperature in the region of the probe tip is over 100° C.

Tube 10 is positioned so that the end within the pipe 6, is inserted in the passageway 18 of the plug 14, while the other end projects from the pipe and is arranged for connection with a plug, or perforated cork 30 positioned in a container or bottle 32. The bottle 32 serves as a constant head liquid source. Toward this end, the cork 30 has three passageways, one for insertion of the tube 10, a second for insertion of a tube 34 leading from a liquid source, e.g. water, and a third 36 which serves as an overflow vent whereby the liquid level in the container 32 may be maintained at a given level. A clamp valve 38 may be placed in a base 40 affixed to the tube 34.

The thermo-couple wire 12, which may be of the thermistor type, should have a heat resistant insulation consistent with the temperature to which it is exposed. The wires 12 are connected to a suitable instrument (not shown), such as a potentiometer if the wires are of the thermo-couple type, and the reading on the instrument is converted to the wet bulb temperature by an appropriate conversion chart. In the alternative, a direct reading self balancing instrument may be used to obtain the wet bulb temperature directly.

To use the probe for a wet bulb temperature measurement, the tube 10 is filled with water from the container 32 with sufficient pressure to remove all air therefrom which will be evident by the continuous drip, or stream of water from the probe tip, or more specifically, from the wad 22. The water pressure is then reduced to a level which allows only about two drops per minute to flow from the probe tip. If the ambient temperature of the probe tip, when in operative position, is at or above 100° C., water is admitted to tube 8 which flows from the tube through the pipe 6 and drained from the end thereof, as previously explained.

The probe is then inserted through a hole 38 in the apparatus, such as an oven, in which a wet bulb temperature reading is desired, with the probe tip being at the desired point of measurement. The wires 12 are then connected to the measuring instrument, as above described and after equilibrium is realized, a wet bulb temperature reading is obtained.

From the foregoing it will be seen that the described embodiment of the invention will satisfy all of the objectives set forth hereinbefore.

The foregoing description has been given in detail without thought of limitation since the inventive principles involved are capable of assuming other forms without departing from the spirit of the invention or the scope of the following claims.

What is claimed is:

1. A wet bulb temperature measuring device including a tubular element, a liquid absorbent material at one end of the tubular element, a thermo-couple wire arranged within the tubular element, one end of said wire being embedded in the liquid absorbent material, a first tube positioned in the tubular element and adapted to deliver a liquid to the liquid absorbent material, and a second tube positioned in the tubular element and adapted to flow a cooling liquid through the tubular element.

2. A wet bulb tempertaure probe including a pipe, a plug enclosing one end of the pipe, said plug being formed with a passageway extending therethrough, a pad of liquid absorbent material secured to the plug, a thermo-couple wire arranged within the pipe, said wire extending through the plug with the end of the wire being embedded in the pad of absorbent material, a first tube positioned in the pipe with an end thereof inserted in the plug passageway so that liquid may be delivered to the pad, and a second tube positioned in the pipe with the end in spaced relation to the end of the plug.

3. A wet bulb temperature probe including a pipe, a plug enclosing one end of the pipe, said plug having passageways extending there-through, a pad of liquid absorbent fibrous material secured to the plug, a pair of thermo-couple wires arranged within the pipe, said wires extending through a passageway in the plug and being sealed therein in liquid tight manner, the ends of said thermo-couple wires being embedded in the pad, a first tube positioned in the pipe with an open end thereof inserted in a passageway of the plug so that liquid may be delivered to the pad, and a second tube positioned in the pipe with an open end in spaced relation to the rear end of the plug.

4. A wet bulb temperature probe according to claim 3, wherein the first tube is arranged for connection with a liquid source having a constant pressure head.

5. A wet bulb temperature probe according to claim 3, wherein said thermo-couple wires are arranged for connection with an instrument which will convert the signal generated by the thermo-couple into information indicative of the wet bulb temperature condition at the tip of the probe.

References Cited by the Examiner

UNITED STATES PATENTS

| | | | |
|---|---|---|---|
| 300,202 | 6/1884 | Boulier | 73—349 |
| 724,066 | 3/1903 | Whiting | 73—349 |
| 1,586,351 | 5/1926 | Bristol et al. | 73—338 |
| 1,632,729 | 6/1927 | Foote et al. | 73—338.6 X |
| 2,261,582 | 11/1941 | Haines | 73—336.5 X |
| 2,494,769 | 1/1950 | Mabey | 73—335 |

ROBERT B. HULL, *Primary Examiner.*

ISAAC LISANN, *Examiner.*

WILLIAM D. MARTIN, *Assistant Examiner.*